US010863250B2

(12) United States Patent
Eksten et al.

(10) Patent No.: US 10,863,250 B2
(45) Date of Patent: Dec. 8, 2020

(54) SYSTEMS AND METHODS FOR PRODUCTION OF FRAGMENTED VIDEO CONTENT

(71) Applicant: IMAGINE COMMUNICATIONS CORP., Plano, TX (US)

(72) Inventors: Brick Eksten, Uxbridge (CA); Stephen Smith, Parker, CO (US); Yuval Fisher, Palo Alto, CA (US); Steven Reynolds, Littleton, CO (US)

(73) Assignee: Imagine Communications Corp., Frisco, TX (US)

( * ) Notice: Subject to any disclaimer, the term of this patent is extended or adjusted under 35 U.S.C. 154(b) by 74 days.

(21) Appl. No.: 16/132,215

(22) Filed: Sep. 14, 2018

(65) Prior Publication Data

US 2019/0090035 A1    Mar. 21, 2019

Related U.S. Application Data

(60) Provisional application No. 62/559,072, filed on Sep. 15, 2017.

(51) Int. Cl.

| | | |
|---|---|---|
| *H04N 21/845* | (2011.01) | |
| *H04N 21/262* | (2011.01) | |
| *H04N 21/2343* | (2011.01) | |
| *H04N 21/24* | (2011.01) | |
| *H04L 29/06* | (2006.01) | |

(Continued)

(52) U.S. Cl.
CPC ....... *H04N 21/8456* (2013.01); *H04L 65/604* (2013.01); *H04L 65/607* (2013.01); *H04N 21/2343* (2013.01); *H04N 21/2405* (2013.01); *H04N 21/26258* (2013.01); *H04N 21/458* (2013.01); *H04N 21/4882* (2013.01)

(58) Field of Classification Search
CPC .......... H04N 21/8456; H04N 21/2405; H04N 21/2343; H04N 21/26258; H04N 21/4882; H04N 21/458; H04L 65/607; H04L 65/604
USPC ........................................................ 709/231
See application file for complete search history.

(56) References Cited

U.S. PATENT DOCUMENTS

| | | |
|---|---|---|
| 6,195,368 B1 | 2/2001 | Gratacap |
| 2004/0140994 A1 | 7/2004 | Choi et al. |
| 2004/0170392 A1 | 9/2004 | Lu et al. |

(Continued)

FOREIGN PATENT DOCUMENTS

WO    2017140685 A1    8/2017

OTHER PUBLICATIONS

International Search Report and Written Opinion issued in International Application No. PCT/CA2018/051146, dated Jan. 4, 2019.

*Primary Examiner* — Tu T Nguyen
(74) *Attorney, Agent, or Firm* — Norton Rose Fulbright US LLP

(57) ABSTRACT

A system for producing fragmented video content is provided. The system includes a processing device, a non-transitory data store, and a memory storage device having at least a Manifest Processing Service (MPS) unit stored therein. The MPS unit is configured to generate at least one master manifest and store the master manifest in the non-transitory data store, the master manifest comprising a timing reference for a video fragment of the fragmented video content, wherein the timing reference indicates a temporal boundary of processing for the video fragment.

20 Claims, 7 Drawing Sheets

(51) Int. Cl.
 *H04N 21/458* (2011.01)
 *H04N 21/488* (2011.01)

(56) References Cited

U.S. PATENT DOCUMENTS

2016/0127440 A1 5/2016 Gordon
2018/0084291 A1* 3/2018 Wei .................. H04N 21/23424

* cited by examiner

| Content Stream | Fragment 1 | Fragment 2 | Fragment 3 | Fragment 4 | Fragment 5 | Fragment 6 |
|---|---|---|---|---|---|---|
| National Content | National Fragment | National Fragment | National Fragment | National Fragment | National Fragment | National Fragment |
| Region 1 Content | National Fragment | Regional Fragment | Regional Fragment | National Fragment | National Fragment | National Fragment |
| Region 2 Content | National Fragment | National Fragment | Regional Fragment | Regional Fragment | Regional Fragment | National Fragment |
| Region 3 Content | National Fragment | Regional Fragment | Regional Fragment | Regional Fragment | Regional Fragment | National Fragment |
| Region 4 Content | National Fragment | Regional Fragment | National Fragment | Regional Fragment | National Fragment | National Fragment |
| Region 5 Content | National Fragment | National Fragment | National Fragment | National Fragment | National Fragment | National Fragment |

FIG. 4

SYSTEMS AND METHODS FOR PRODUCTION OF FRAGMENTED VIDEO CONTENT

FIELD

Embodiments generally relate to the field of producing, managing and streaming video content. More specifically, embodiments relate to systems and methods for live video production and processing.

INTRODUCTION

Video experiences delivered over the air, via satellite and over the cable systems can be delivered as a continuous stream of content that is encoded, transmitted and decoded with very strict cadence. The cadence of the delivery may be tied to a frame/field rate of the content, and processing of the content at almost every stage of its life needs to be done in real-time or near real-time, that is, in accordance with a specific frame rate. For example, video with a frame rate of 25 frames per second requires processing components that handle the video to be able to render, deliver or otherwise complete operation on a single frame of video within 40 ms (1000 ms/25 frames=40 ms/frame). Systems and devices which are part of the video production chain, e.g. cameras, switchers, playout systems, processors and encoders, may need to be produce or consume the content according to this strict timing restriction and often with a predetermined latency (e.g. processing time within each system) in order to stay within an overall processing time limit throughout the production facility and throughout the distribution topology.

SUMMARY

In an aspect, there is provided computer-processor-implemented video production system for producing fragmented video content. The system has a processor that receives a plurality of video fragments, each fragment being a separately managed unit of content, a non-transitory data store, and a memory storage device having at least a Manifest Processing Service (MPS) unit and a timing model stored therein. The processor aligns the plurality of video fragments with the timing model, wherein each video fragment is associated with a respective timing reference based on the timing model, wherein each timing reference indicates a temporal boundary of processing for a video fragment. The processor configures the MPS unit to generate at least one master manifest and store the master manifest in the non-transitory data store, the master manifest comprising the timing references for the video fragments, the timing references for processing the video fragments.

In some embodiments, the system further comprises a user interface with visual elements corresponding to timing guides generated based on the timing references to visually indicate the temporal boundaries of the video frames to align a production event with a video fragment.

In some embodiments, the system further comprises a Manifest Orchestration Service (MOS) unit stored on the memory storage device, the MOS unit configured to manage video processing requirements based on the master manifest to align events to the video fragments In some embodiments, the MOS unit is configured to route one or more fragments of the fragmented video content based on the master manifest.

In some embodiments, the system further comprises a rules engine stored on the memory storage device, the rules engine configured to identify one or more fragments requiring augmentation based on the one or more requirements of scheduled events from the master manifest.

In some embodiments, the system further comprises a delivery system for isochronous delivery of an output video stream generated using the plurality of video fragments and the master manifest.

In some embodiments, the processor generate a manifest for generating a first video output stream from a set of video fragments, the master manifest and the timing references being independent from the manifest.

In some embodiments, the master manifest indicates location data for pulling video fragments from different storage devices to generate a video output stream.

In some embodiments, the MPS provides an instruction set for tracking of production events.

In some embodiments, the timing guides indicate reference frames for compressed video content.

In some embodiments, the processor is configured to: convert, via a transcoder, source content into the plurality of video fragments; process, via the transcoder, one or more of the plurality of video fragments based on the master manifest to generate processed video fragments; generate a fragmented-video manifest based on the processed video fragments, the fragmented-video manifest containing timing data and location data for the processed video fragments to generate a video stream suitable for origination, the location data indicating a storage location of the processed video fragments, the timing data indicating a sequence of the processed video fragments; and output the fragmented-video manifest for generation of a video stream using the processed video fragments.

In some embodiments, the processor is configured to process another set of one or more of the plurality of video fragments based on the master manifest, generate another fragmented-video manifest, and output another video stream being different than the video stream.

In some embodiments, the processor is configured to process a first set of video fragments using a first processing technique and a second set of video fragments using a second processing technique.

In some embodiments, the plurality of video fragments comprise one or more of a file based video fragment, a live video fragment, and a rendered video fragment.

In another aspect, there is provided a manifest processing service device configured to receive one or more one or more video processing requirements for video content and generate a master manifest, the video content being a plurality of video fragments aligned with a timing model, wherein each video fragment is associated with a respective timing reference based on the timing model, wherein each timing reference indicates a temporal boundary of processing for a video fragment, the master manifest comprising manifest-driven processing requirements for a video fragment of the video content, wherein the manifest-driven processing requirements comprise the timing references for the video fragments.

In some embodiments, the device is connected to a manifest orchestration service configured to receive one or more video processing requirements for the video fragments, and transmit, to a transcoder, one or more control signals representing control commands for processing the video content based on the master manifest file.

In some embodiments, the control commands comprise information representing one or more of: overlays, advertisement, captions, and emergency text data.

In some embodiments, the device is further configured to balance network resources based on the video processing requirements and to determine one or more unique video fragments of the video content to be processed.

In some embodiments, the device is connected to a transcoder configured to: receive one or more control signals representing control commands for processing the video fragments; process the one or more video fragments based on the control commands and the master manifest, wherein processing the one or more video fragments comprise inserting overlays into the one or more video fragments based on the one or more timing references.

In an aspect, there is provided a computer-processor-implemented video production system for producing fragmented video content. The system has a processor that receives a plurality of video fragments, each fragment being a separately managed unit of content; a non-transitory data store; and a memory storage device having at least a Manifest Processing Service (MPS) unit and a timing model stored therein; wherein the processor aligns the plurality of video fragments with the timing model, wherein each video fragment is associated with a respective timing reference based on the timing model, wherein each timing reference indicates a temporal boundary of processing for a video fragment; wherein the processor configures the MPS unit to generate at least one master manifest and store the master manifest in the non-transitory data store, the master manifest comprising the timing references for the video fragments. The system has a user interface with visual elements corresponding to timing guides generated based on the timing references to visually indicate the temporal boundaries of the video frames to align a production event with the temporal boundaries, the user interface configured to receive a selection for the production event, wherein the processor updates the master manifest based on the selection for the production event. When an event is placed arbitrarily in the timing model, it may not align to the fragmented timing model. The user interface has timing guides to assist in aligning the events to the fragmented timing model of the master manifest.

In some embodiments, the system has a Manifest Orchestration Service (MOS) unit stored on the memory storage device, the MOS unit configured to manage video processing requirements based on the master manifest to align events to the video fragments based on the timing model.

In some embodiments, the MOS unit is configured to route one or more fragments of the fragmented video content based on the master manifest.

In some embodiments, the system has a rules engine stored on the memory storage device, the rules engine configured to identify one or more fragments requiring augmentation based on the one or more requirements of scheduled events from the master manifest.

In some embodiments, the system connects to a delivery system for isochronous delivery of an output video stream generated using the plurality of video fragments and the master manifest.

In some embodiments, the processor generates a manifest for generating a first video output stream from a set of video fragments, the master manifest and the timing references being independent from the manifest.

In some embodiments, the master manifest indicates location data for pulling video fragments from different storage devices to generate a video output stream.

In some embodiments, the MPS provides an instruction set for tracking of production events.

In some embodiments, the timing guides indicate reference frames for compressed video content.

In some embodiments, the processor is configured to: convert, via a transcoder, source content into the plurality of video fragments; process, via the transcoder, one or more of the plurality of video fragments based on the master manifest to generate processed video fragments; generate a fragmented-video manifest based on the processed video fragments, the fragmented-video manifest containing timing data and location data for the processed video fragments to generate a video stream suitable for origination, the location data indicating a storage location of the processed video fragments, the timing data indicating a sequence of the processed video fragments; and output the fragmented-video manifest for generation of a video stream using the processed video fragments.

In some embodiments, the processor is configured to process another set of one or more of the plurality of video fragments based on the master manifest, generate another fragmented-video manifest, and output another video stream being different than the video stream.

In some embodiments, the processor is configured to process a first set of video fragments using a first processing technique and a second set of video fragments using a second processing technique.

In some embodiments, the plurality of video fragments comprises one or more of a file based video fragment, a live video fragment, and a rendered video fragment.

In another aspect, there is provided a computer-process-implemented method for producing video content. The method involves: receiving video processing requirements for video content; receiving one or more video fragments of the video content, each fragment being a separately managed unit of content; aligning the one or more of video fragments with a timing model, wherein each video fragment is associated with a respective timing reference based on the timing model, wherein each timing reference indicates a temporal boundary of processing for a video fragment; generating at least one master manifest and store the master manifest in the non-transitory data store, the master manifest comprising the timing references for the video fragments and video processing requirements; and processing the one or more video fragments based on the master manifest.

In accordance with an aspect, there is provided a computer-processor-implemented system for producing fragmented video content. The system may include: processing device; a non-transitory data store; and a memory storage device having at least a Manifest Processing Service (MPS) unit stored therein. The Manifest Processing Service (MPS) unit may be configured to generate and store at least one master manifest in the data store, the master manifest configured to provide a timing reference for a video fragment of the fragmented video content, and the timing reference indicates a temporal boundary of processing for the video fragment.

The system can align the fragmented video content with a timing model, wherein each of a plurality of fragments of the fragmented video content is associated with a respective timing reference based on the timing model.

In some embodiments, the system may include a Manifest Orchestration Service (MOS) unit stored on the memory device, the MOS unit configured to manage video processing requirements based on the master manifest.

In some embodiments, the MOS is configured to route one or more fragments of the fragmented video content based on the master manifest.

In some embodiments, the system may include a rules engine stored on the memory device, the rules engine configured to identify one or more fragments requiring augmentation based on one or more requirements of scheduled events from the master manifest.

In accordance with another aspect, there is provided a Manifest Processing Service configured to receive one or more one or more video processing requirements for a video content and generate a master manifest, the master manifest comprising manifest-driven processing requirements for a video fragment of the video content.

In some embodiments, the manifest-drive processing requirements may include a timing reference indicating a temporal boundary of processing for the video fragment.

In accordance with another aspect, there is provided a Manifest Orchestration Service configured to receive one or more video processing requirements for a video content and transmit, to a transcoder, one or more control signals representing control commands for processing the video content.

In some embodiments, the one or more video processing requirements may include a timing reference indicating a temporal boundary of processing for a video fragment of the video content.

In some embodiments, the control commands may include information representing one or more of: overlays, advertisement, captions, and emergency text data.

In some embodiments, the MOS may be further configured to balance network resources based on the video processing requirements and to determine one or more unique video fragments of the video content that need to be processed.

In accordance with yet another aspect, there is provided a transcoder configured to: receive one or more control signals representing control commands for processing a video content; receive one or more video fragments of the video content; and process the one or more video fragments based on the control commands, wherein the control commands comprising information representing one or more timing references for processing the video fragments.

In some embodiments, processing the one or more video fragment includes inserting overlays into the one or more video fragments based on the one or more timing references.

In accordance with yet another aspect, there is provided a computer-processor-implemented method for producing video content, the method comprising: receiving video processing requirements for a video content; receiving one or more video fragments of the video content; and processing the one or more video fragments based on the video processing requirements, wherein the video processing requirements comprise one or more timing references for processing the video fragments.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 shows an example of a video content playlist in accordance with one embodiment;

DETAILED DESCRIPTION

Figure 1:
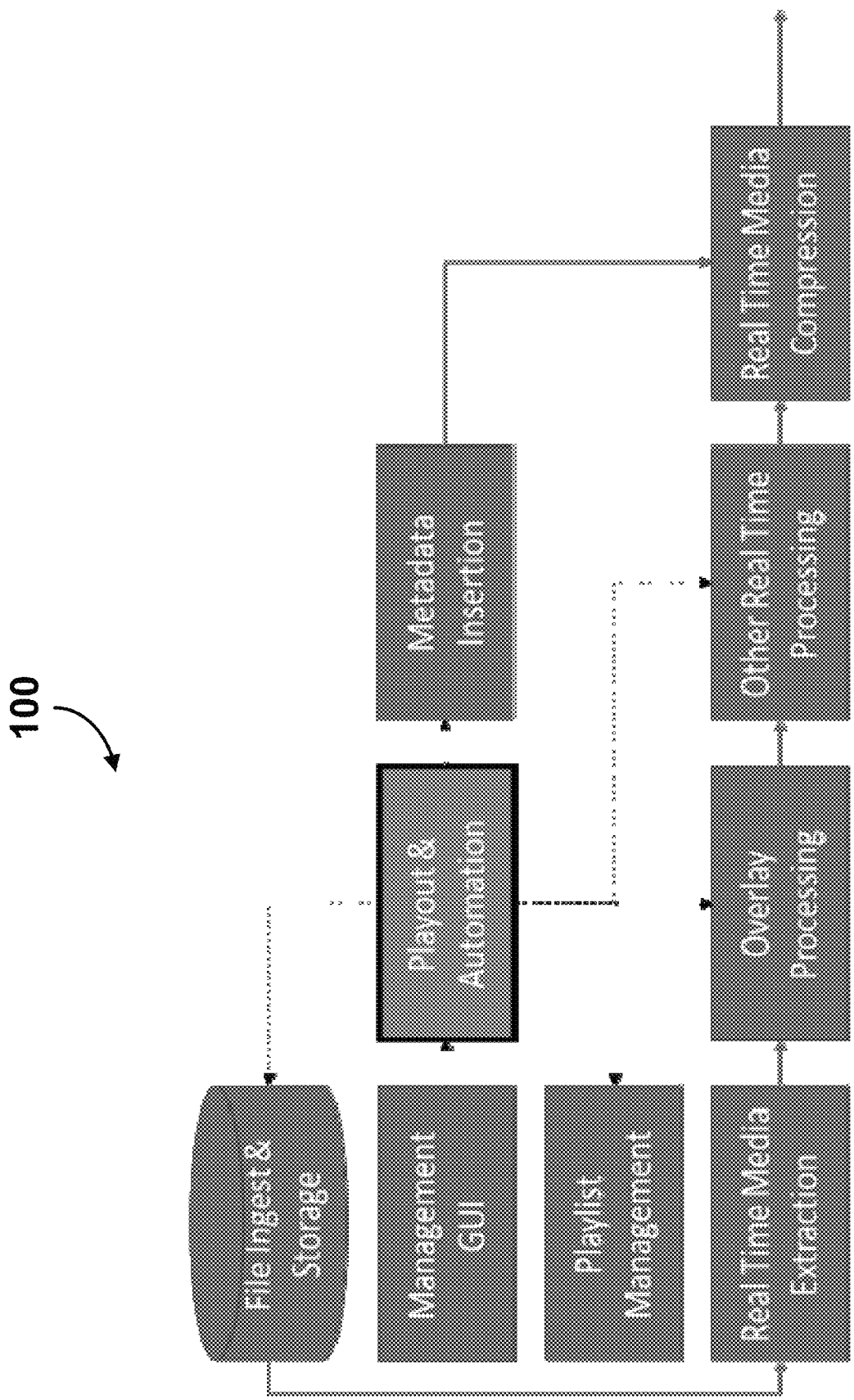
FIG. 1 is block diagram of an example traditional real-time video processing pipeline.

Throughout the following discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

Throughout the disclosure, the term "video" may be used to describe moving pictures, associated audio and accompanying metadata. That is, a video may be inclusive of video data, audio data, metadata, and/or any other embedded data.

Traditionally, systems and devices such as cameras, switchers, playout systems, processors and encoders, generally need to produce or consume a live video content according to a strict timing restriction and often with a predetermined latency in order to stay within an overall processing time limit throughout the production facility and throughout the distribution topology. A real-time nature of this operational model and the sequential processing architectures that support it, including the orchestration and control planes, require time-sensitive and mostly dedicated devices. It is thus highly desirable to move most of the devices in the production chain to general computer platforms and cloud systems. The demanding requirements of running synchronous streams in these devices and across the associated networks creates a fundamental imbalance in computer and network requirements that were not considered in the design of those computer engines and networks. This in turn may make the system brittle in operation and require expensive solutions such as duplicate networks and computer infrastructure, expensive processors (CPUs), multiple CPUs, accelerator cards to off-load CPU, and fixed purpose/dedicated devices, to name a few. Within a computer host it may be required to lock down the functionality of a portion of the CPU, dedicating it to the sole function of receiving or transmitting video content such that this portion of the CPU is locked out of participating in the general computer load running on the system.

Mechanisms used to move a frame of video from one processing stage to the next may require the frame to be represented as an uncompressed sample. This means that for cost, storage, or transport efficiencies, a video asset on disk or storage and that has had compression applied therein needs to be unwrapped and decoded from its file container and codec before participating in the real-time delivery ecosystem. The unwrapping and decoding process is computationally intensive and the resulting uncompressed samples may be bandwidth intensive. Similarly, a processing component such as a graphics device needs to receive the high-bandwidth uncompressed samples and render, when appropriate, the necessary text or graphic overlays for each frame before passing the frame (sometimes an augmented frame) to the next device in the processing chain. A production chain may be an example of a processing chain. Because overlays may occur at any time in the stream, the complete video stream is driven through this computationally demanding process, whether or not there are overlays throughout the complete video or not. Eventually the uncompressed and possibly augmented frames may need to be re-compressed or encoded for distribution to client devices, which ingest or receive compressed video streams because distribution mechanisms carry multiple services and there is insufficient bandwidth/economies to distribute video in its uncompressed form. This encoding process must also run in real-time or near real-time while requiring high bandwidth for its input and being very computationally intensive.

Each time a video is decoded and re-encoded there may be generational loss of quality and intensive processing, which leads to complexity and cost. There may be several generations of decoding, processing and encoding between the source of content and its final consumption by its intended audience, e.g. a mobile device. When video content providers originate a video stream, they tend to use a production system that manages the above-described real-time processes. The production system converts playlists, which may be sequences of video content corresponding to different programs, advertisements, and live content, into an output stream, allowing for pre-scheduled and real-time control of stream switching, overlay insertion, and monitoring.

The production system may also be responsible for inserting metadata and other types of data into the video stream, where such insertions may also be scheduled in the playlist as secondary events. This metadata can include captioning data or information (such as SCTE-35 cues) specifying the location in the stream of advertisements or program start and end locations. This metadata is an important component of the video distribution ecosystem, but since it is carried in-band in the video stream, accessing it (for example, to substitute national advertisement with local advertisement, or to translate captioning information from one language to another) also requires computationally complex processes.

FIG. 1 shows an example of traditional real-time video processing system 100 in block diagrams. Each block represents a logical processing step in the pipeline. As can be seen, there may be a significant amount of processing and management of video content that is produced and streamed in real-time, which may take up a lot of network resources.

Part of the reason that there may be a great amount of effort in traditional real-time video processing is that network designs, inclusive of computer, may operate as a fixed purpose topology, dedicated to adhering to the strict cadence required by intrinsic video timing. Historically speaking, when video was still in analog form, the strict timing was an engineering requirement of the system to ensure that all processing would happen on strict frame boundaries. At present, with current computer environment, the problem can be solved differently, as timing can be handled locally within the devices that require strict manipulation within a video content (i.e. switching from one content stream to another with frame accuracy).

Video networks have also changed dramatically. Distribution systems may no longer use a strict cadence of video delivery, and the notion of "real-time" may be solved independently at each device (e.g. mobile device, television, or other), with delivery mechanism based on fragmented video.

Fragmented video, as used in ABR streaming protocols (such as MPEG DASH or Apple's HLS), breaks video and audio into sequences of short-duration chunks, often referred to as "fragments", that are reconstituted at the client devices (or "client" for short) and played back sequentially. Video fragments may be created at different bitrates and resolutions so that client devices can choose an appropriate fragment based on network bandwidth or other considerations. Typically, a fragment may represent between 2 to 6 seconds of encoded video, though other fragment durations are possible.

For example, a video content or asset may be encoded into multiple streams or profiles of video and/or audio content with varying bitrates. For example, the encoder may output five video streams, each at a bitrate of 0.2, 1, 3, 6, and 8 Mbps, which may correspond respectively to a resolution of 320×180p, 640×360p, 1280×720p, 1280×720p, and 1920× 1280p. The varying bitrates may allow a client device to accommodate different network conditions while streaming the video. Each encoded stream at a fixed bitrate or resolution may be referred to as a single profile. For example, each of the encoded streams may be an MPEG transport stream of a specific bitrate or resolution. Once encoded, each profile may be segmented, by a segmenting process, into multiple, contiguous file segments which are also referred to as fragments. The encoding and segmenting processes may be performed by a server or a different computing device or circuit. Each file segment or fragment may be a multi-second portion of the stream or profile. For example, each file segment or fragment may be a stream of 2 to 10 seconds long. In some embodiments, both video and audio are fragments encoded such that each video profile may contain both video and audio data. In some embodiments, the audio content may be separated from the video content, and is encoded to its own audio fragments or profile. In some embodiments, each fragment may be further encapsulated and/or encrypted for secure transmission. Part or all of the fragments may be further stored on a storage device. A manifest file (or manifest) may be configured to keep track of locations of all the fragments.

Clients may download a manifest or a playlist that contains information about the available fragments suitable for download and playback. In on-demand video, manifests typically list all available fragments, while in linear steams, manifests may be updated to inform clients about the most recently available fragments. Fragmented video is used predominantly over IP networks by over-the-top (OTT) providers to deliver file based assets that have been preprocessed and/or compressed and stored for consumption on demand and for live streams that have been preprocessed using traditional real-time systems and then encoded and/or chunked in real time.

Currently, fragmented video is used primarily for distributing video to client devices, such as tablets, phones, computers, smart TVs, and TV-connected playback devices. Production systems can originate content that is not fragmented, which is then consumed by over-the-air devices (such as televisions), service aggregators (such as MVPDs), or regional broadcasters. The use case for fragmented video and the use case for a production system may require different technologies and devices (e.g., transcoders and packagers) that convert real-time playout-originated video into fragmented video. Therefore, providing timing of fragmented video at the start of content processing and/or content production may lead to optimization of resources and efficiency across the entire video distribution network.

Interframe video compression takes a sequence of frames and generates compressed output. Each Frame can be referred to as "I" and a compression engine can consider the difference between I (a frame) and the next frame I2, I3, I4 and so on.

Regular video may be referred to as I1, I2, I4 . . . I30 from 1-30 as 1 second of video made up of 30 frames. The interframe compression looks at the difference between I1 and I2 and can store the difference (for purposes of explanation). If both I1 and I2 are pure black then the difference is zero, if all 30 frames of video are black then you have 30:1 compression (simplified for purposes of explanation). In the real world, however, there are differences between the video frames. A compression engine stores I1 as its reference frame and then it creates P2 instead of I2. P2 contains only the differences between I1 and I2. Then the compression engine creates a P3 which is the difference between P2 and I3.

A video sequence has I frames (reference frames) and P frames (predictive frames) and could look like this IPPPPPP . . . I. To make things complicated the intermediate frames can reference backwards in time. On frame 10 you can have a reference to frame 1 (e.g. take this bit from frame 1 and put it here in frame 10). These can be referred to as B frames (backwards frames). The video sequence can look like IPPBPPBPPBPPBPPB . . . I. These sequences can be referred to as GOP structures (group of pictures) and they can align to fragments.

I frames are typically much larger than P and B frames (which only contain image differences). This all presumes that the video is changing only subtly from frame to frame. If you interject sudden changes in video such as large graphics, a switch between cameras, or even high action sequences then the compression engine is forced to use new I frames in (which are large) and restart the GOP structure. This dramatically lowers the compression efficiency and because the bandwidth of the network is fixed, you have to change a different variable, most often you have to give up quality to achieve the same bandwidth while encoding more complex video.

In order to playback this sequence you must start at one of the real frames (an I frame), in this example case I1 as it is the sample of video upon which all following samples are built. If a system misses the opportunity to start at I1 it has to wait for the next full video GOP in order to start playback.

Decisions to create events, switch video, insert advertising, and so on, can happen arbitrarily in production. This forces the entire production system to be right sized (for worst case processing as explained above), and it places a burden on all downstream systems which typically use fragmented video because the decisions are arbitrary and may not align to fragment boundaries. Also, by working on linear streams instead of fragments, the entire system must be right sized for worst case processing. This creates cost and complexity.

When an event is placed arbitrarily in the timing model, it may not align to the fragmented timing model (the timing of the video fragments). Embodiments described herein improve the process by introducing 'hints or guides' to the editorial process so that changes in video more naturally occur on fragment boundaries. The hints or guides can provide visual effects in an interface to visually indicate fragment boundaries to help better align event placement during production. This improves efficiency of the systems, optimizes deployment, and improves quality.

In accordance with an embodiment, there is provided a system that utilizes fragmented video in a production environment. As described herein, the utilization of fragmented video in production may simplify the processing and assembly of video content, allows for a mixture of real-time and non-real-time processing and delivery of video, which may lead to a significant reduction of computational processing requirements. The system can introduce 'hints or guides' to the video data to improve production processes.

Embodiments described herein may provide systems, methods and devices for providing fragmented video for live content production. The system may not need modification of existing workflows for origination of video content. The system may provide hints or guidance for editorial timing and processing with potential benefits to downstream optimization. The system may simplify the processing chain for video delivery. The system may reduce generational loss caused by repeated encoding steps. The system may enable flexible computing models for the processing or augmentation of video. The system may reduce or eliminate the need for IP networks to behave as signal switched video paths. The system may leverage existing fragmented video capabilities. The system may reduce infrastructure requirements. The system may reduce or eliminate real time constrains of video origination. The system may scale quickly and easily. The system may align with modern cloud and datacenter architecture. The system may be deployed on common computer platforms. The system may provide improved inclusion of video metadata. The system may allow playout of video in fragmented format, which may be more resilient to errors and suitable for more cost-effective emission of video.

In some embodiments, there is provided a system for providing fragmented video for live content production that may include utilizing a fragmented video as a primary delivery mechanism over the network. The move from continuous sequential streams to fragmented streams may solve many problems in the production pipeline and may have downstream benefits in terms of reduced cost, improved quality, and simplicity of the network topology.

In an aspect, a fragmented video may be aligned to a virtual reference timing model, which may generate boundaries of processing that act as hints for further optimization downstream. The virtual reference timing model may be independent from a manifest. This timing model may be carried throughout the production system and may be used as reference for further processing in the network and timing of events within the content stream. The system may generate a master manifest file which may be used to pull content from multiple sources. The system may include a fragmented-video Manifest Processing Service (MPS), which may also be referred to as a Master Manifest Engine, as part of the production system. This MPS may act as a master reference throughout the production system and may produce a master manifest(s) to act as timing references for current and future processing As the reference of record, the MPS provides the context (timing target) that all downstream (future) decisions can follow. The MPS can be the instruction set of which timing is the primary objective as well as historical tracking of production events. The MPS may for instance contain references to inactive references. There may be a reference to content which has been subsequently replace (as an example). In an embodiment, the master manifest may be a formatted list of timing references. This master manifest may supersede the notion of a playlist or schedule in which timing is only related to content itself. The system may include a Master Orchestration Service (MOS), which may also be referred to as a Master Orchestration Engine, the MOS may be configured to manage video processing requirements as dictated by the master manifest. The manifest has contents that can be somewhat arbitrary. A manifest could be expanded upon to be inclusive of new technology. For instance a manifest from last year could be updated to contain instructions for process this year which uses new technology. An example of that is updating the normalization engine. If you have a time segment X and the video fragment is shorter than X then you can either repeat frames or cut to black for the remaining duration of X. An update to the technology might allow for time dilation (stretching) where the video would be processed so that it would now properly fill X and the manifest would contain specific instructions or flags that would allow this to happen. The MOS can route video according to the requirements of the manifest, and/or manage scale and deployment of the production system according to the requirements of the master manifest.

Figure 2:
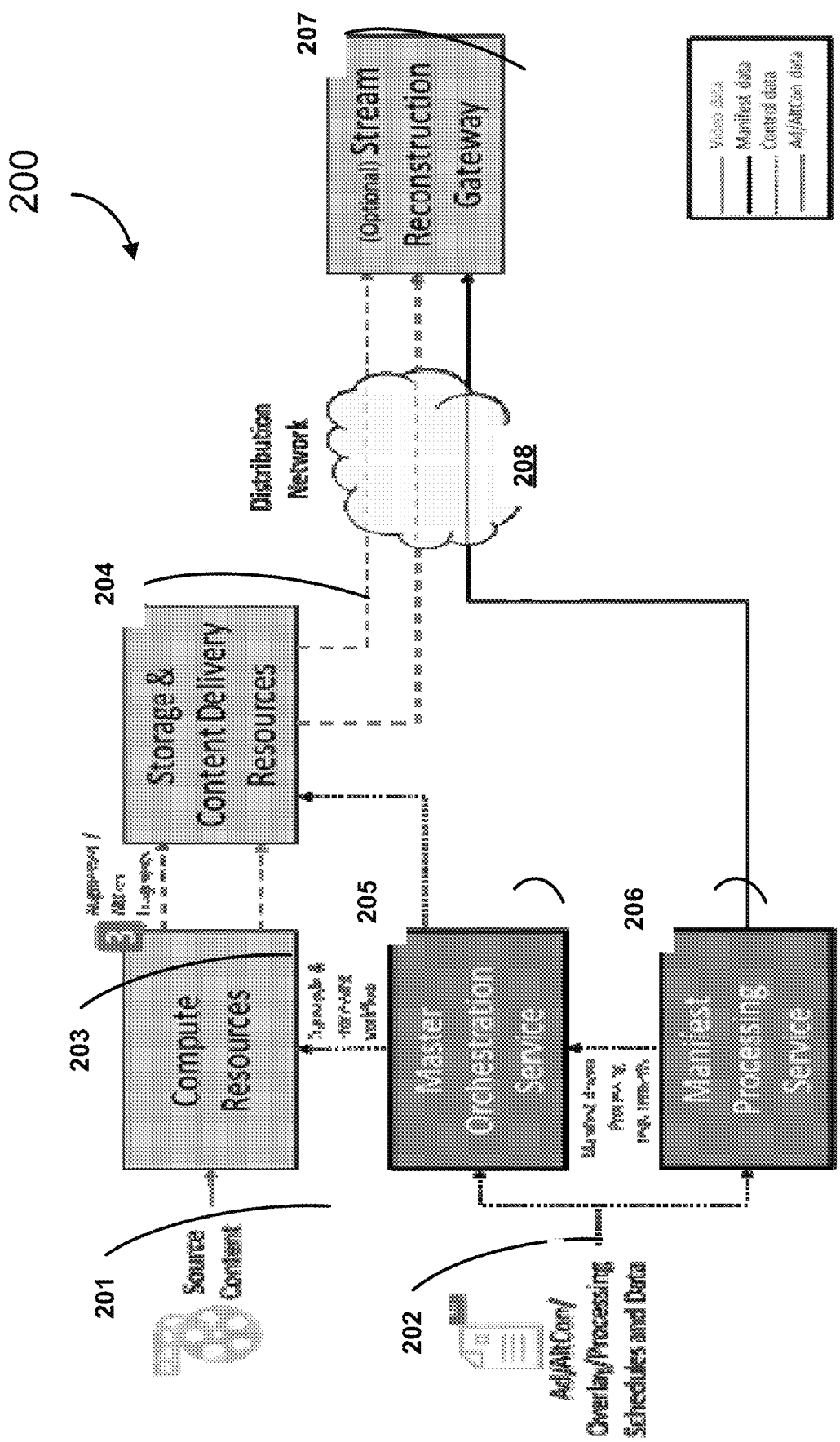
FIG. 2 is a block diagram of an example video production system in accordance with one embodiment.

Referring now to FIG. 2, which illustrates a block diagram of an example video production system 200, in accordance with an embodiment. As shown, system 200 may include a source content 201, an Advertisement and Alternate Content (AltCon) service 202, computing resources 203, storage & content delivery resources 204, Master Orchestration Service 205, Manifest Processing Service 206, optional stream reconstruction gateway 207, and a network for video distribution 208. Each component is further described below.

The Manifest Processing Service 206 can transmit manifest driven processing requirements to Master Orchestration Service 205. The Master Orchestration Service 205 can transmit transcode and processing workflow data to computing resources 203. The computing resources 203 can transmit augmented (processed) fragments and AltCon fragments to storage & content delivery resources 204.

In an embodiment, source content 201 may be delivered to computing resources 203 in multiple source formats (e.g., mezzanine). In some embodiments, content can be provided as file based video sources, live video sources, or any mix of live or file based sources. Content can be normalized ahead of a time as it may be needed by an offline transcoding solution. Content timing references may be normalized by a Manifest Processing Service 206. In some embodiments, Manifest Processing Service 206 may include a Master Manifest Engine configured to normalize the content timing references. A time reference can be based on the timebase used in a specific region. For instance North America uses 30 and 60 frames per second where Europe uses 25 and 50. For the purposes of some transformation between timebases it is acceptable to simply manipulate timestamps. For instance to go from 24 frames per second (film) to 25 FPS (euro standard) it is acceptable to simply play the video slightly slower, filling in the 1 frame per second differential. A content timing reference could be the video standard as described above. The content timing reference it could be an arbitrary target standard set by device, network, or processing limitations. Content timing references can be used to direct when certain fragments or larger portions of the video are located temporally in a stream (e.g., to delay a fragment by 2 seconds). Content timing references are about the manipulation of time in order to meet the output (delivery) requirements. Content can be delivered by reference either through a dependent proxy file, or through description in a playlist or manifest. When content is delivered by reference, the system can request for the content from a remote server at that reference before it receives the actual content. Content can be delivered by any number of protocols such as ftp, http, or other protocol in a timing manner where the result is indistinguishable from live. Content can be delivered by any number of protocols such as ftp, http, or other protocols in a manner that emulates a file delivery. Content can be provided as encrypted or unencrypted.

In an embodiment, content can be managed against the timing reference in the master manifest. Events can be asynchronous to the master manifest. In some embodiments, content timing does not need to be limited to the master reference timing. Physical fragmentation of content may be for the purpose of physical distribution of the content. Physical fragmentation of content can be asynchronous to the timing implied in the master manifest. In some examples, non-aligned video fragments may be normalized back to physical fragments as appropriate or required. Event timing can be somewhat arbitrary. For instance in reaction to a producer yelling 'cut to camera 3' which creates a break in the normal video delivery. There are many reasons for asynchronous events to occur. The events may not align to naturally occurring fragment boundaries. Non-aligned video fragments refer to those that are asynchronous to the master manifest timing. Non-aligned video fragments are asynchronous to natural fragment boundaries (e.g. 2 second fragments and an event happens at T+1.5). There are several ways of dealing with this such as inserting I-Frames to force an asynchronous event to align to a fragment boundary, filling in gaps, stretching video, and so on.

In an embodiment, Advertisement and Alternate Content (AltCon) information in AltCon 202 can be utilized to create playlists ingested by the production system, when appropriate or required. The AltCon information may facilitate dynamic creation of streams with alternate content that may be targeted to a subset of distribution, as well as signaling the insertion of metadata (such as the location of program and advertisement boundaries) into the production stream. In some embodiment, AltCon information may be stored in a database. In some embodiment, AltCon information may be dynamically provided by a server. The streams can be created or ingested for the purposes of supply a different video clip. An example is blackouts. Where the local game has not sold out, the rights holder must fill in that portion of the playlist with alternate content such as another game, or just arbitrary programming. In other regions that do not have blackout rules in effect the original game is shown despite the fact that it wasn't sold out. Playlists are how traditional systems look at the world. Playlists are the operational and planning view of what will become a master manifest which is the computer view of the world used for distribution purpose.

In an embodiment, computing resources 203 may include components such as an offline video transcoder and/or an on-line live transcoder. The transcoders may be used to convert Source Content 201 into a format suitable for fragmented video delivery. The computing resources 203 may be managed by the Master Orchestration Service 205 and in the case of the offline transcoder can be applied to the Source Content 201 well in advance of the video content playout time. An optimization algorithm within the Master Orchestration Service 205 or Manifest Processing Service 206 may ensure that Source Content 201 utilized in multiple output streams need only be processed once. The transcoder may also be used to insert text and graphic overlays into the video stream, when their content and timing is known in advance, or just-in-time when the overlays are known at the playout time. The insertion based on manifests/playlists can be received from the playlist and subsequent (downstream) substitutions happen in manifests. Lastly, the transcoder may also insert metadata into the video stream, such as captioning or other program data. Any manipulation of timing such as the synchronization of closed captioning to video content or the expansion of content length may also be handled within the transcoder service. Sources of content (caption, video, audio) can have some reference timebase embedded in the stream. They may not come from the same wall clock but if you know the relative start times you can align them all to the same master timebase. For example, captioning can performed at a lower level e.g., where certain data within fragments are manipulated, although it is possible to do this at the manifest level as well. An example use case for this is live sports where captioning comes from an external service. This external service introduces a delay and that delay is visible by the consumer as; Pitch happens, batter swings, home run, all is in sync (audio video) in the meantime the captions are still being processed and some time after the home run the captions will arrive and you will see 'home run' in captioning on the screen. There are multiple opportunities to 'fix' this problem. You could introduce a delay to the original audio/video to compensate for the caption service at the production head end, in the transcoder and both of this mean just introducing enough buffering to overcome the delay, or you can do the delay at the distribution end (in someones phone) by forcing the phone to wait until it has all content.

Storage and content delivery resources 204 may in some embodiments hold video fragments and transmit them as necessary. Storage and content delivery resources 204 may also be managed by the Master Orchestration Service 205.

A Master Orchestration Service 205 may provide overall coordination of content manipulation, event timing, computing and storage resources and may serve as the master reference for downstream optimization. The Master Orchestration Service 205 may also be used to manage pre-processing and real-time insertion of video fragments that require graphic or text overlays at appropriate times. The Master Orchestration Service may control a fragment transcoder that is part of the Computing Resources 203 available to the system 200 and that is used to transcode fragments requiring overlays, by supplying it with the overlay data and only appropriate fragments requiring processing.

A Master Processing Service 206 may generate unique manifests for each required playout stream. A manifest can be generated in a specific way to control timing of portions of video, to control which fragments are included, based on a playlist received from AltCon 202, based on the identity of the user receiving the playout, the type of mobile device they are receiving it on, their region, and so on. Multiple manifests can be generated at the production system by reading all variants of the playlist (national, regional, local) and creating references to all of the common and unique content for each distribution point. For example, when you watch video on a mobile device, the manifest that your device is receiving is created just for that playback at your device. The only thing that is unique however is the references to advertising and that advertising could be an existing (cached) video fragment(s) or it could be new content that has to be fetched form a server, or it could be just stills that get inserted, and may work in concert with the Master Orchestration Service 205 to deliver the final streams. In one aspect, utilization of fragmented timing as provided by a master manifest may allow an operator or automated solutions to use the fragmented timing as hints for event decisions which may lead to downstream optimizations.

A MPS 206 may be configured to receive one or more one or more video processing requirements for a video content and generate a master manifest, the master manifest comprising manifest-driven processing requirements for a video fragment of the video content. The video processing requirements may be obtained from AltCon service 202.

In some embodiments, the manifest-drive processing requirements may include a timing reference indicating a temporal boundary of processing for the video fragment.

In some embodiments, Master Orchestration Service 205 may work with Master Processing Service 206 to generate one or more manifest. In some other embodiments, Master Orchestration Service 205 may independent produce a manifest.

An optional Stream Reconstruction Gateway 207 may be used to generate linear, sequential content from the fragmented video.

The system 200 receives or generates video fragments (from source content 201). Each fragment can be a separately managed unit of content. The system 200 (via a processor) aligns the video fragments with the timing model. Each video fragment is associated with a respective timing reference based on the timing model. Each timing reference indicates a temporal boundary of processing for a video fragment. The MPS 206 generates at least one master manifest and stores the master manifest in the non-transitory data store. The master manifest comprising the timing references for the video fragments for use in processing the video fragments. The master manifest can be used at production to align timing of events (for example) with the timing of video fragments, for example. When an event is placed arbitrarily in the timing model, it may not align to the fragmented timing model. The master manifest can be used to better align events to the fragmented timing model.

In some embodiments, the system 200 can generate a user interface with visual elements corresponding to timing guides generated based on the timing references to visually indicate the temporal boundaries of the video frames to align a production event with a video fragment. The timing guides can help align events to the fragmented timing model at the production stage. The MOS 205 can manage video processing requirements based on the master manifest to align events to the video fragments using the timing model. In some embodiments, the MOS 205 can route one or more fragments of the fragmented video content based on the master manifest during the production process.

In some embodiments, the system 200 can identify fragments requiring augmentation based on the one or more requirements of scheduled events from the master manifest. The augmentation can be carried out at the production stage to trigger processing of a fragment for example. The augmentation or processing of a fragment can generate a new fragment.

In some embodiments, the system 200 can generate a manifest for generating a first video output stream from a set of video fragments, the master manifest and the timing references being independent from the manifest. For example, A unique manifest (for playout) can be generated with a reference to the new fragment (e.g. augmented fragment), for example.

In some embodiments, the system 200 has a delivery system for isochronous delivery of an output video stream generated using the video fragments and the master manifest.

In some embodiments, the MPS 206 provides an instruction set for tracking of production events. The instructions can be used to better align production events with fragments.

In some embodiments, the timing guides indicate reference frames for compressed video content. The master manifest can also include compression data to better align events to reference frames, for example.

In some embodiments, the system 200 can convert source content into the video fragments. The system 200 can process the video fragments based on the master manifest to generate processed video fragments that align to the timing model or reference, for example. The system 200 can generate a fragmented-video manifest based on the processed video fragments. The fragmented-video manifest contains timing data and location data for the processed video fragments to generate a video stream suitable for origination. The location data can indicate a storage location of the processed video fragments and the timing data can indicate a sequence of the processed video fragments. The system 200 can output the fragmented-video manifest for generation of a video stream using the processed video fragments.

In some embodiments, the system 200 can process another set of video fragments based on the master manifest and generate another fragmented-video manifest. The other set of processed video fragments can be used to generate a new video stream.

In some embodiments, the system 200 can process a first set of video fragments using a first processing technique and a second set of video fragments using a second processing technique. In some embodiments, the video fragments can be file based video fragment, a live video fragment, or a rendered video fragment.

Figure 7:
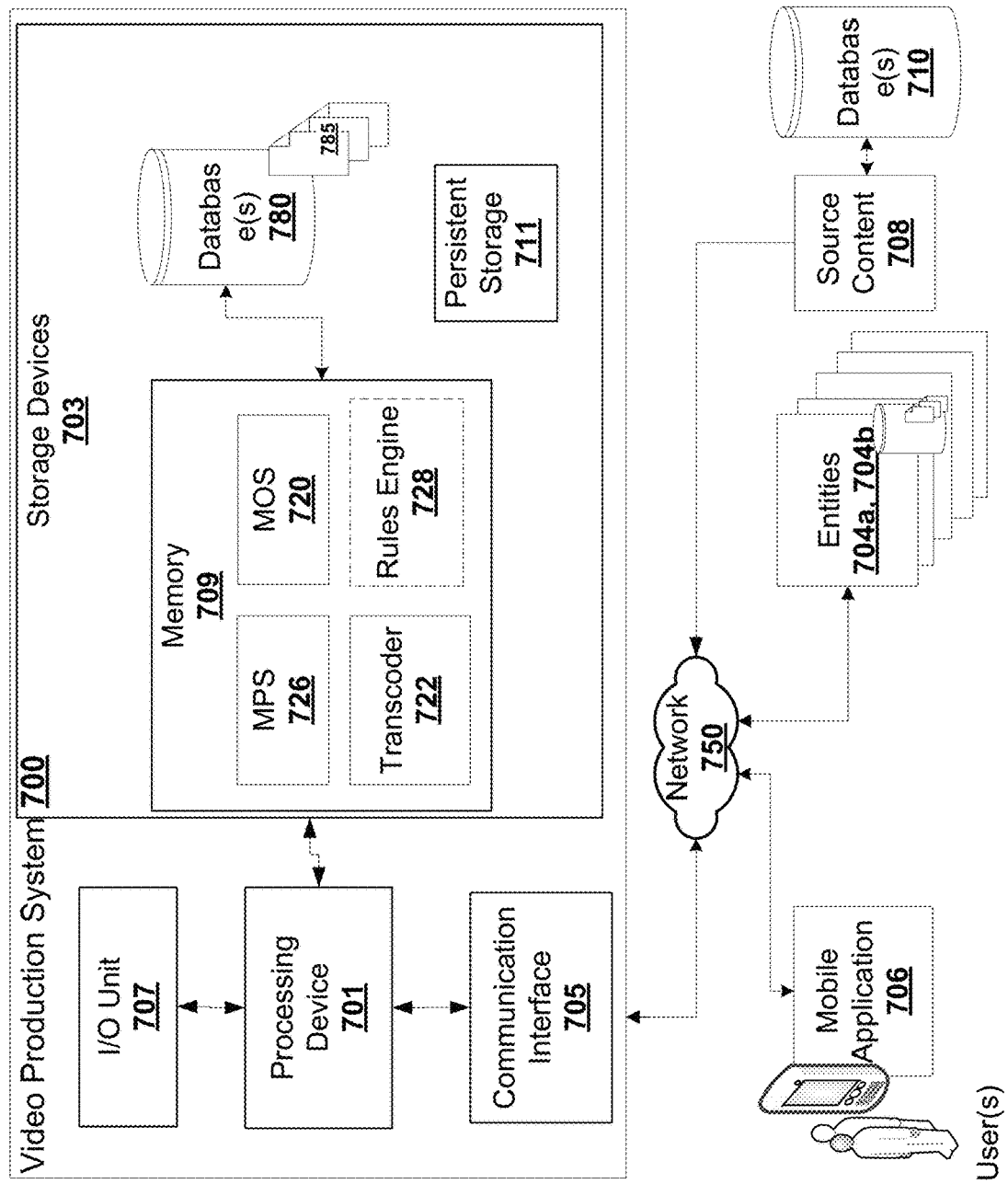
FIG. 7 is schematic diagram of a video production system, in accordance with one embodiment.

Referring now to FIG. 7, which shows a schematic diagram for an example video production system 700 in accordance with some embodiments. System 700 may be configured to: receive source content 708 from databases 710; process and playout fragmented video content for origination; and transmit the video content over network 705, to entities 704*a*, 704*b* such as TV broadcasters. System 700 may also be configured to transmit the video content directly to end users' mobile devices with mobile application 706.

Each I/O unit 707 enables the system 700 to interconnect with one or more input devices, such as a keyboard, mouse, camera, touch screen and a microphone, or with one or more output devices such as a display screen and a speaker.

A processing device 701 can execute instructions in memory 709 to configure Manifest Processing Service 726, Manifest Orchestration Service 720, Transcoder 722 and optional Rules Engine 728. A processing device 701 can be, for example, a type of general-purpose microprocessor or microcontroller, a digital signal processing (DSP) processor, an integrated circuit, a field programmable gate array (FPGA), a reconfigurable processor, or a combination thereof.

Each communication interface 705 enables the system 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The storage 711 may be configured to store information associated with the video processing units. Storage 780 and/or persistent storage 711 may be provided using various types of storage technologies, such as solid state drives, hard disk drives, flash memory, and may be stored in various formats, such as relational databases, non-relational databases, flat files, spreadsheets, extended markup files, etc.

Database 780 may be configured to store playlists and manifests 785.

MOS 720 may retrieve manifests 785 from databases 780, and manage transcoder 722 to process video content (e.g. source content 708). The transcoder 722 may be configured to: receive one or more control signals from MOS 720 representing control commands for processing a video content 708; receive one or more video fragments of the video content; and process the one or more video fragments based on information representing one or more timing references from a manifest 785. Transcoder 722 may insert one or more overlays into the one or more video fragments based on the one or more timing references in manifest 785.

MOS 720 may also determine, based on business rules or other program scheduling requirements, that a new manifest is needed. MOS 720 may send a request to MPS 726 to generate a new manifest 785 based on the business rules or other program scheduling requirements. The business rules can come from upstream business systems or parallel manifest manipulation systems (third party) such as Google which creates its own ad placement markers. The manifest 785 may be stored in database 780.

Rules Engine 728 is optional and may identify one or more video fragments requiring augmentation based on one or more requirements of scheduled events from a manifest 785. Augmentation may include, for example, text and graphic overlays, or additional audio track.

Figure 3:
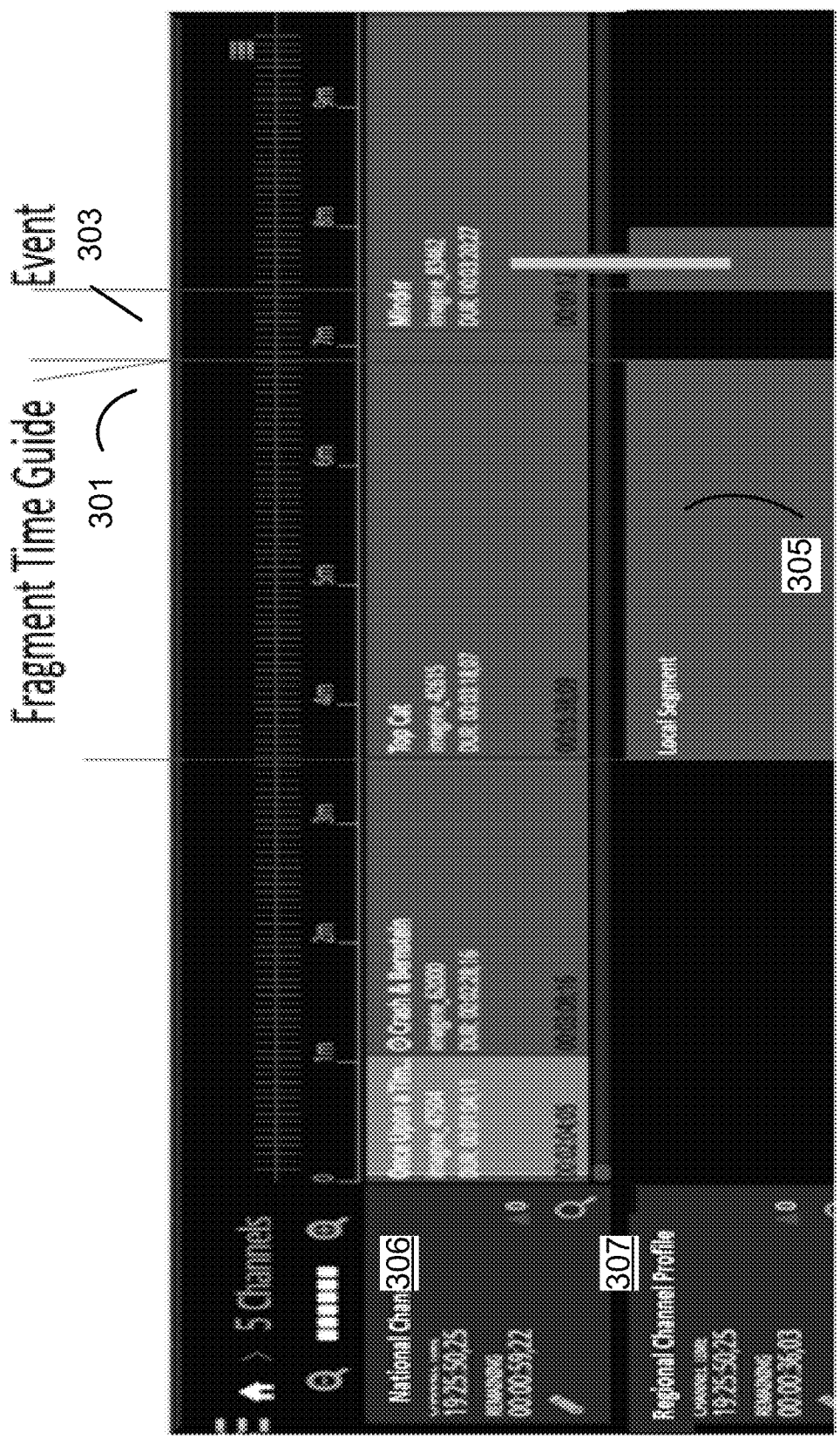
FIG. 3 demonstrates example timing guides in an example video production system.

Referring now to FIG. 3, which demonstrates example timing guides 301 defined by fragment boundaries. The timing guides can be visual effects or clues in the operators environment. The guides can be generated at the playlist level, for example. They provide a hint to the operator so that the operator can make decisions (editorial decisions, event placements) which align to what will become fragment boundaries. Manifest can be generated using the fragment boundaries. As described herein, the timing guides 301 may provide guidance for timing of an event 303. The timing guides 301 may provide one or more profiles, e.g. national channel profile 306 or regional channel profile 307. A regional channel profile 307 may contain local segment content 305. When an event 303 is placed arbitrarily in the timing model, it may not align to the fragmented timing model. The timing guides 301 can be used to help align events with the timing of the video fragments during production.

In an aspect, the timing guides 301 may be used for reference during production and may be used to guide decisions when producing live content. This can involve the insertion of events into the video data, for example. The event can be aligned with the timing of the fragment for a natural effect. For instance, a switch in video which may normally happen at an arbitrary time may be deferred to align with fragment time based on timing guides. For example, if the chosen fragment length is two seconds, then from the start of the show, the system can place a timing guide at every two second mark (e.g. the frame boundary). That way the operator has the option to align switching video (e.g. between cameras) to those two second marks and that forces the entire system to behave more naturally with respect to being fragmented in the future. The fragmented video is chopped up or segmented video. However, given the use compression standards which use both inter and intra frame compression, there is a structure to the video. That structure includes what is known as reference frames. These reference frames (Sometimes called I-Frames) are points in the compressed stream where you can just jump in and play video from that reference point. If you try to do this (e.g. define an event) between reference points you will get garbage until you hit the next reference point. The timing guides 301 can indicate the reference frames, for example. Timing guides 301 may also be used to highlight a parent/child relationship between national channel(s) 306 and regional channels 307. This can make it clear to the operator that there is a 'right time' and a 'not so right time' at which to insert events such as a switch between national and local video segments.

The master manifest may represent a combination of actual event timing and the timing guide for the fragments. For instance if the timing guide 301 is on 2 second boundaries (02:00-04:00) and the event is at 02:02. Events can refer to a portion of the video e.g., when an overlay needs to be inserted. There are other examples of events, such as advertisements and captions. The MOS 205, 720 may determine that the video between 02:00 and 04:00 (the fragment boundaries) needs to be manipulated, but video fragments between 00:00-02:00 and 04:00-06:00 do not. The master manifest may in this case reference the final video by retrieving 02:00-04:00 from one place (wherever the video was manipulated) and everything else directly. The master manifest can include location data for the augmented video fragment. The master manifest can also include data for augmenting or processing the video fragment. A master manifest can contain information that specifies the time in a video that an event (e.g., overlay, caption, insertion of regional content based on a manifest from AltCon 202) should occur, as well as how specific video fragments within that video should be scheduled or the time at which they should occur in a video (i.e., using a timing guide). MOS 205, 720 can then, based on that information in the manifest, select a certain video fragment for manipulation or request a certain video fragment to be manipulated (e.g., to insert an overlay at 02:02) and, perhaps with Master Orchestration Service 205, control transcoder at 203 and generate a new video fragment with the overlay content inserted at 02:02. The compression of the video is an aspect to factor in given reference frames. This compression data can also be stored in the master manifest.

In an aspect, utilization of physically fragmented video in the delivery of video throughout the production system may allow the delivery of video between systems to move from synchronous delivery to isochronous delivery. This may provide benefits to the overall system by lowering processing overhead, allowing networks to operate at native speeds, and allowing systems to operate more efficiently. The ability to support isochronous delivery means that the network can request fragments at full network speeds. In a normal linear video delivery network the video always moves through the network at a fixed rate. This is problematic when you move to IP where competing traffic can interfere at all levels of the network (at the start, in the middle, on your phone). The ability to leverage fragments at the production level means that formerly 'fixed' networks can become isochronous in nature, allowing the production systems to act more like a traditional IP attached device and less like a specific piece of video equipment. It somewhat removes the constraints for the equipment to act with very specific processing latency.

Referring now to FIG. 4, which shows an example of a video content playlist 400 in accordance with one embodiment. A playlist can be the same as a manifest that has instructions for manipulating the timing and identity of video fragments in a video stream. In some embodiments, the playlist 400 may include one or more content streams, such as for example national content 403, region 1 content 405*a*, region 2 content 405*b*, and so on (405*c*, 405*d*). Each content stream 403, 405 may include one or more of video fragments 401*a* . . . 401*f*. Some streams (e.g. regions 1 to 4 405*a*, 405*b*, 405*c*) may have unique fragments (e.g. "regional fragment"), while others (e.g. region 5, 405*d*) show only national content. By generating a unique playlist or manifest 785 for each region, a number of combinations of national and unique fragments is possible. Manifests can be generated at all stages. The reason to have a manifest instead of a playlist is that playlists are for operators, manifests are for computers, providing them with instructions for where to find content, what its timing is, and what should be done with the content.

In some embodiments, manifests 785 may be generated as many as required to service as many outputs as necessary. In some cases, millions of manifests may be generated during one second.

For example, a unique manifest 785 may be generated for each destination, e.g. each of television service, channel, and mobile device. The MOS 205, 720 may take in requests from each destination and generate a unique manifest correspondingly, based on the rules of the AltCon service 202.

Figure 5:
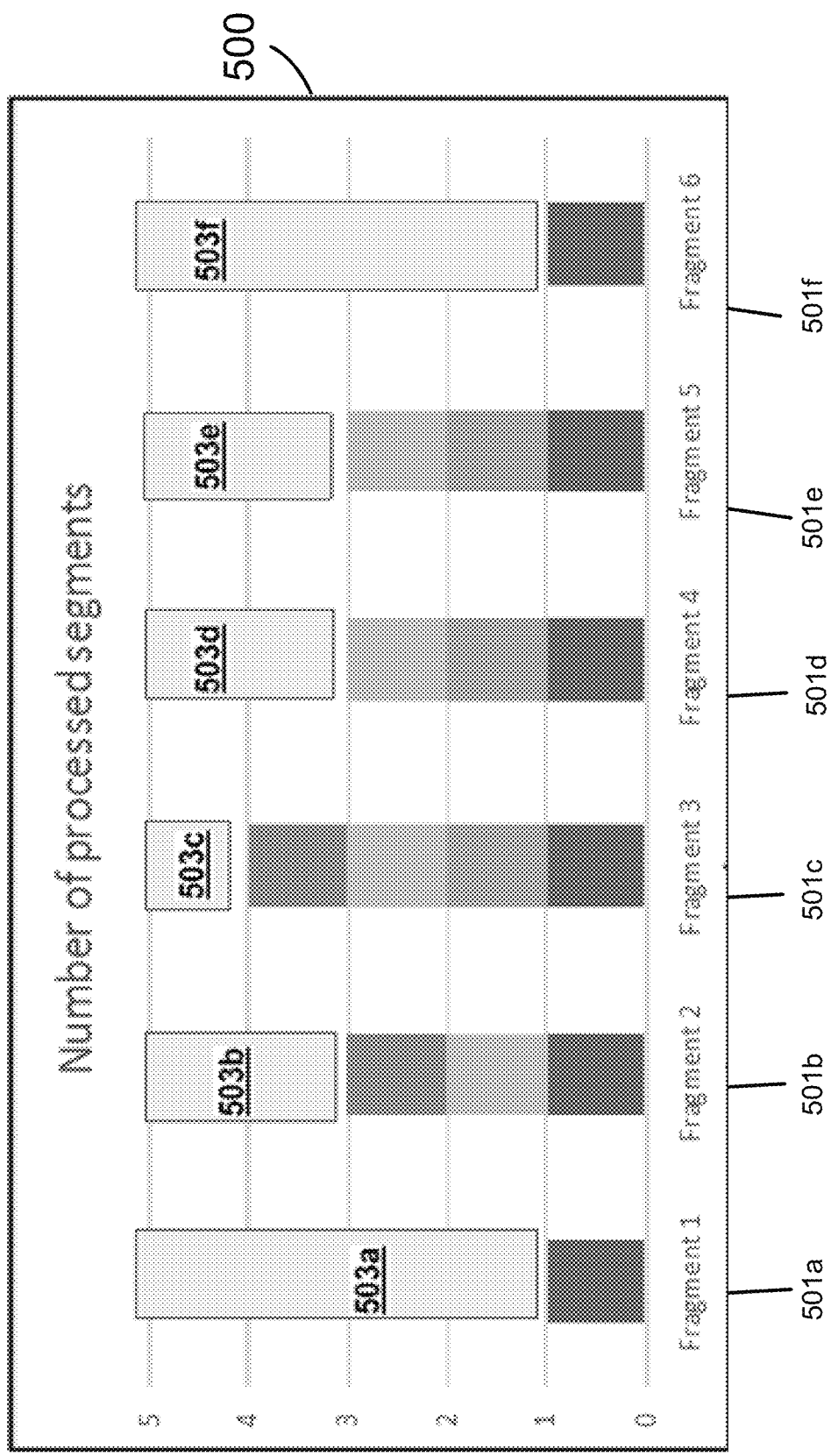
FIG. 5 shows an example computational load for processing the five regions in FIG. 4.

Referring now to FIG. 5, which shows an example computational load for processing the five regions 501*a* . . . 501*f* in FIG. 4. In this example, the space above each bar 501*a* . . . 501*f* corresponds to a computational saving 503*a* . . . 503*f* provided by system 200, 700. The system only has to process the video fragment that needs to be manipulated instead of the entire video (and can know which fragment to select for processing based on a manifest that identifies where/when events need to be inserted.

In accordance with some embodiment, a system utilizing fragmented timing and the master manifest may allow operations of the overall network to be more predictable. Any real-time processing of video in traditional playout may be shifted to a system that can process video in real-time, when needed, and ahead-of-time, when possible. This may allow the computationally intensive processing to be done in advance when input streams and timing data allows. Traditional systems run linearly in time, and have very strict restrictions on processing latency. This means that the entire chain of compute in a traditional system has to be provision for the worst case processing scenario to guarantee that all video can be processed in 'real-time'. In a fragmented system you can easily skip entire segments of video (a movie) where there is no further downstream processing required. A counter example would be the sports event that is full of complex graphics but for which only the scores will update in real-time. All complex graphics can be done ahead of time and only the scores needs to be updated in real-time. It also significantly reduces the real-time computational overhead required by traditional playout systems. When real-time processing is required, for example for addition of emergency alert text overlays that cannot be scheduled in advance, the system 200, 700 may process only the video fragments that require the overlay, not the complete video, further reducing computational load.

Figure 6:
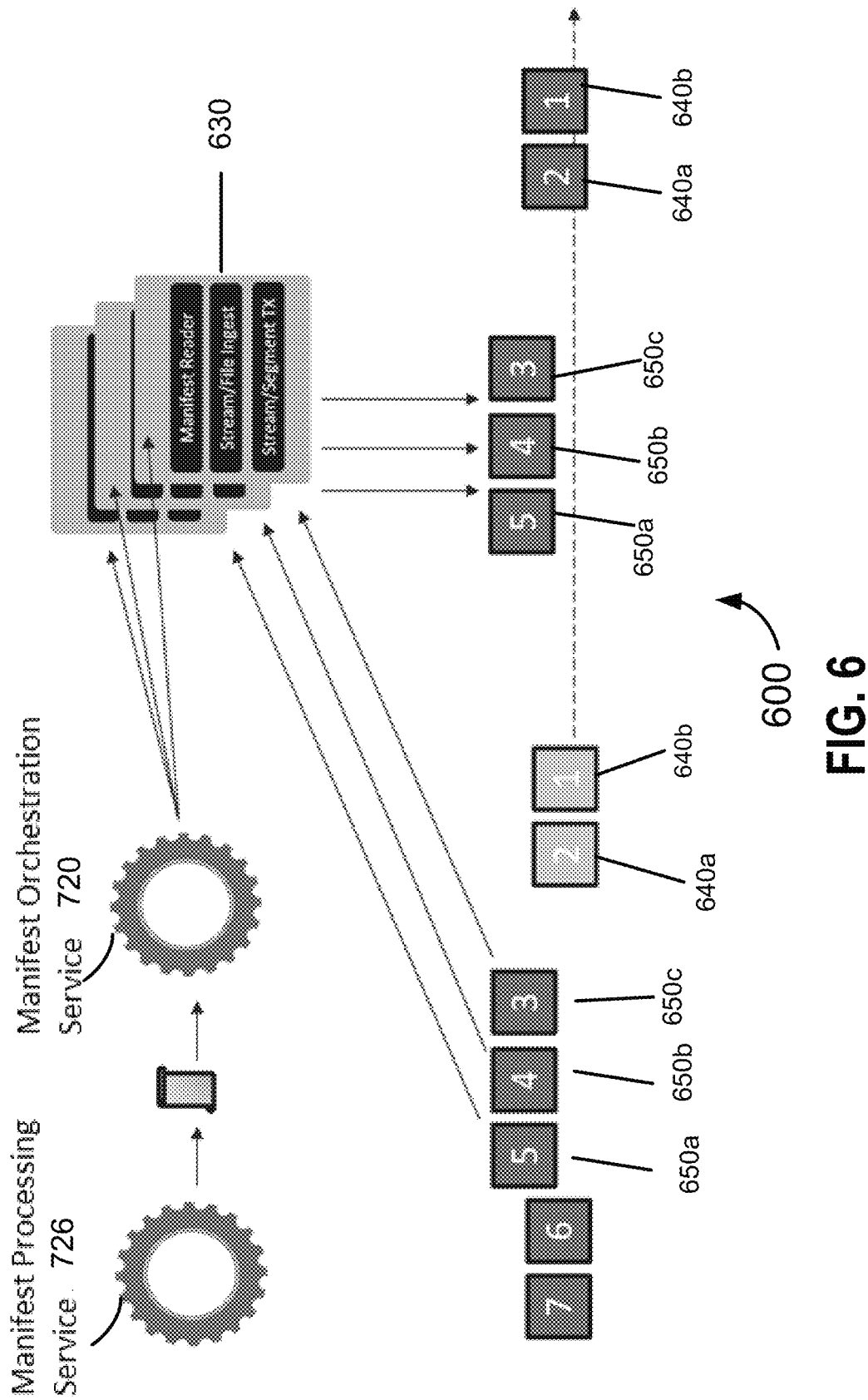
FIG. 6 shows an example workflow of Manifest Processing Service (MPS) and Manifest Orchestration Service (MOS) in accordance with one embodiment.

Referring now to FIG. 6, which shows an example workflow 600 of the Manifest Processing Service (MPS) 206, 726 and the Manifest Orchestration Service (MOS) 205, 720 in accordance with one embodiment. The MPS 206, 726 may drive generation of new video fragments and the MOS 205, 720 may recognize the need for additional computing resources 630 for certain fragments 650*a*, 650*b*, 650*c*. In this case, only those fragments 650*a*, 650*b*, 650*c* which are unique pass through the computing resources 630. Anytime the requirement for producing unique fragments exists you can leverage the system to 'right size' the required compute to create the desired outputs. The recognition can be based on a manifest that specifies events, scheduling requirements, and/or timing in relation to specific fragments.] That and unique graphics, blackout mapping, alternative content, etc. MPS creates the instructions, the compute resource fulfills them. All other fragments 640*a*, 640*b* may continue through the production pipeline. A unique fragment may be a fragment that needs to be manipulated independently for one reason or another. For instance ABC New York has a master channel, ABC buffalo has its own version. ABC buffalo may need to replace graphics in the video stream with their local version and insert local content.

When the rendering of new fragments is required to represent graphical overlays, compositions and other augmentations, the MOS 205, 720 may orchestrate and/or execute the Manifest Processing Service 206, 726 to create the new fragment in time for delivery. The resulting output may be a live fragmented-video manifest that is representative of the programmers' intended channel using a combination of file, live and rendered fragments. A manifest is a file full of reference information that tells whatever system is listening where to find the source content, and its timing. It contains no actual content, the content is contained in fragments. A manifest is a list of fragments.

In some embodiments, there is provided a production system using fragmented video based on one or more of: File based Fragments; Live Fragments; Augmented Content Fragments; Data Fragments; Compressed video formats.

In some embodiments, there is provided a Master Manifest Engine which may act as a system of record for content timing. Such content may include one or more of: File based Fragments; Live Fragments; Augmented Content Fragments; Data Fragments.

Master Manifest Engine may deliver unique manifests to each end user, while MPS 206, 726 may perform the generation of unique content.

In some embodiments, there is provided a Master Orchestration Service which may manage scale in the network according to requirements in the master manifest. The scale may be one or more of: Network Scale; Computer Scale; Content Quality.

For example, the MOS may be configured to align the number of computing resources necessary to complete the processing of unique video segments in time for delivery. For another example, MOS may be configured to control the orchestration of networks based on bandwidth constraints.

In some embodiment, there is provided a system and method for using fragmented timing as a reference to align events to fragmented video to optimize downstream delivery when needed.

In some embodiment, there is provided a system and method for using fragmented video as an optimization of the production network.

In some embodiment, there is provided a system and method for optimizing downstream processing according to one or more requirements of a master manifest. Such optimization may include one or more of: optimizing scale; optimizing bandwidth; optimizing Quality.

In some embodiment, systems and methods may be implemented throughout a production environment to provide overlay of Fragment time, transformation of content into fragmented video, selective application of compression based on solution requirements, and so on. In some embodiment, systems and methods may be implemented between production systems to provide: overlay of Fragment time; transformation of content into fragmented video, selective application of compression based on solution requirements, and so on. In some embodiment, systems and methods may be implemented between production and delivery systems to provide overlay of Fragment time, transformation of content into fragmented video, selective application of compression based on solution requirements. In some embodiment, systems and methods may be implemented between delivery systems to provide: overlay of Fragment time, transformation of content into fragmented video, and selective application of compression based on solution requirements.

In some embodiment, systems and methods disclosed herein may be implemented to provide interleaved live, file and augments fragments.

In some embodiments, systems and methods disclosed herein may include a rules engine or an overlay manager that identifies fragments requiring augmentation based on the requirements of scheduled events.

In some embodiments, systems and methods disclosed herein may include an orchestrator or manager that prioritizes and controls the generation and/or rendering of augmented fragments. The orchestrator or manager may be part of MOS.

In some embodiments, systems and methods disclosed herein may include a normalization engine that aligns events to fragment time and fragmented video. The engine may be configured to optimize schedules, bandwidth, and compute utilization by aligning events and or content to fragment time. The engine may also be configured to align events to fragment time by extending or truncating content, and/or by synthesizing content to fill in gaps in time.

In some embodiments, systems and methods disclosed herein may include a de-duplication algorithm that identifies and consolidates duplicate or redundant augmentations within one or more channels.

In some embodiments, systems and methods disclosed herein may include a content generation engine that produces augmented fragments as early as possible including up to the time of delivery.

In some embodiments, systems and methods disclosed herein may be configured to provide interoperability with programming, planning and scheduling systems.

In some embodiments, systems and methods disclosed herein may be configured to align with television origination operational practices.

In some embodiments, systems and methods disclosed herein may be configured to operate on one or more of: consistent length fragments; variable length fragments; and combination of consistent & variable length fragments.

In some embodiments, systems and methods disclosed herein may be configured to provide manifest augmentation capability that provides for insertion of arbitrary data into the master manifest. For example, the systems and method may be configured to encode and decode specific data in the manifest and translate it into specific instructions which may be used for downstream triggering of events. For another example, the systems and method may be configured to provide data extraction from source fragments or manifests to make execution decisions such as trigger events.

In some embodiments, systems and methods disclosed herein may be configured to switch between live, file and augmented sources.

In some embodiments, systems and methods disclosed herein may provide a software-only implementation that runs on common computer. Optional acceleration hardware may be implemented if appropriate.

In some embodiments, systems and methods disclosed herein may generate digitally signed delivery certificates, thereby providing the ability to countersign a delivery certificate with an auditable log of delivered content.

In some embodiments, systems and methods disclosed herein may generate authenticated audit logs which may show the difference between intended delivery and actual delivery of content.

In some embodiments, systems and methods disclosed herein may provide user control interface allowing manual input or manipulation of instructions that may configure or otherwise result in the manifest output.

In some embodiments, systems and methods disclosed herein may provide encryption techniques to protect content or requisite decryption to enable manipulation of content.

In some embodiments, systems and methods disclosed herein may leverage encoding slices to reduce the computational effort and generational loss in fragment augmentation.

In some embodiments, systems and methods disclosed herein may include an optimization engine which manipulates the manifest to optimized delivery of content. The optimization engine may be configured to perform one or more of the following actions: add, subtract, or augment the manifest to control network utilization; add, subtract, or augment the manifest to control CPU utilization on a device; and the ability to add, subtract, or augment the manifest to control the insertion of content from alternative systems.

Present disclosure provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-processor-implemented video production system for producing fragmented video content, comprising:
   a processor configured to receive:
      a plurality of source video fragments, each source video fragment being a separately managed unit of content;
      overlay content; and
      video processing requirements for generation of at least one augmented video fragment by insertion of the overlay content into at least one source video fragment, the augmented and source video fragments comprising a plurality of video fragments, each video fragment associated with a respective timing reference based on a timing model, each timing reference indicating a temporal boundary of processing for a video fragment;
   a non-transitory data store; and
   a memory storage device having at least a Manifest Processing Service (MPS) unit and the timing model stored therein;

wherein the processor is configured to:
  align the plurality of video fragments with the timing model;
  configure the MPS unit to generate at least one master manifest, the at least one master manifest comprising the timing references for the video fragments, the overlay content and the video processing requirements; and
  store the master manifest in the non-transitory data store, the master manifest comprising the timing references for the video fragments, the timing references for processing the video fragments.

2. The computer-processor-implemented video production system of claim 1, wherein the system further comprises a user interface with visual elements corresponding to timing guides generated based on the timing references to visually indicate the temporal boundaries of the video fragments to align a production event with a video fragment.

3. The computer-processor-implemented video production system of claim 2, wherein the timing guides indicate reference frames for compressed video content.

4. The computer-processor-implemented video production system of claim 1, further comprising a Manifest Orchestration Service (MOS) unit stored on the memory storage device, the MOS unit configured to manage the video processing requirements based on the master manifest to align events to the video fragments based on the timing model.

5. The computer-processor-implemented video production system of claim 4, wherein the MOS unit is configured to route one or more fragments of the fragmented video content based on the master manifest.

6. The computer-processor-implemented video production system of claim 1, further comprising a rules engine stored on the memory storage device, the rules engine configured to identify one or more fragments requiring augmentation based on one or more requirements of scheduled events from the master manifest.

7. The computer-processor-implemented video production system of claim 1, further comprising a delivery system for isochronous delivery of an output video stream generated using the plurality of video fragments and the master manifest.

8. The computer-processor-implemented video production system of claim 1, wherein the processor generate a manifest for generating a first video output stream from a set of video fragments, the master manifest and the timing references being independent from the manifest.

9. The computer-processor-implemented video production system of claim 1, wherein the master manifest indicates location data for pulling video fragments from different storage devices to generate a video output stream.

10. The computer-processor-implemented video production system of claim 1, wherein the MPS provides an instruction set for tracking of production events.

11. The computer-processor-implemented video production system of claim 1, wherein the processor is configured to:
  convert, via a transcoder, source content into the plurality of video fragments;
  process, via the transcoder, one or more of the plurality of video fragments based on the master manifest to generate processed video fragments;
  generate a fragmented-video manifest based on the processed video fragments, the fragmented-video manifest containing timing data and location data for the processed video fragments to generate a video stream suitable for origination, the location data indicating a storage location of the processed video fragments, the timing data indicating a sequence of the processed video fragments; and
  output the fragmented-video manifest for generation of a video stream using the processed video fragments.

12. The computer-processor-implemented video production system of claim 11, wherein the processor is configured to process another set of one or more of the plurality of video fragments based on the master manifest, generate another fragmented-video manifest, and output another video stream being different than the video stream.

13. The computer-processor-implemented video production system of claim 11, wherein the processor is configured to process a first set of video fragments using a first processing technique and a second set of video fragments using a second processing technique.

14. The computer-processor-implemented video production system of claim 1, wherein the plurality of video fragments comprises one or more of a file based video fragment, a live video fragment, and a rendered video fragment.

15. A manifest processing service device configured to receive one or more video processing requirements for video content and generate a master manifest, the video content being a plurality of video fragments including at least one augmented video fragment having overlay content, the plurality of video fragments aligned with a timing model, wherein each video fragment is associated with a respective timing reference based on the timing model, wherein each timing reference indicates a temporal boundary of processing for a video fragment, the master manifest comprising manifest-driven processing requirements for a video fragment of the video content, wherein the manifest-driven processing requirements comprise the timing references for the video fragments.

16. The manifest processing service device of claim 15 connected to a manifest orchestration service configured to receive one or more video processing requirements for the video fragments, and transmit, to a transcoder, one or more control signals representing control commands for processing the video content based on the master manifest.

17. The manifest processing service device of claim 16, wherein the control commands comprise information representing one or more of: overlays, advertisement, captions, and emergency text data.

18. The manifest processing service device of claim 16, further configured to balance network resources based on the video processing requirements and to determine one or more unique video fragments of the video content to be processed.

19. The manifest processing service device of claim 15 connected to a transcoder configured to:
  receive one or more control signals representing control commands for processing the video fragments; and
  process the one or more video fragments based on the control commands and the master manifest, wherein processing the one or more video fragments comprise inserting overlays into the one or more video fragments based on the one or more timing references.

20. A computer-process-implemented method for producing video content, the method comprising:
  receiving video processing requirements for video content, the video processing requirements including processing requirements for generation of at least one augmented video fragment by insertion of overlay content into at least one source video fragment;
  receiving the overlay content;

receiving one or more source video fragments of the video content, each source and augmented video fragment being a separately managed unit of content, the source and augmented video fragments comprising a plurality of video fragments, each video fragment associated with a respective timing reference based on the timing model, each timing reference indicating a temporal boundary of processing for a video fragment;

aligning the one or more video fragments with a timing model;

generating at least one master manifest, the at least one master manifest including data for augmenting the at least one augmented video fragment;

storing the master manifest in a non-transitory data store, the master manifest comprising the timing references for the video fragments, the overlay content and the video processing requirements; and processing the one or more video fragments based on the master manifest.

\* \* \* \* \*

UNITED STATES PATENT AND TRADEMARK OFFICE
CERTIFICATE OF CORRECTION

PATENT NO. : 10,863,250 B2
APPLICATION NO. : 16/132215
DATED : December 8, 2020
INVENTOR(S) : Brick Eksten et al.

Page 1 of 1

It is certified that error appears in the above-identified patent and that said Letters Patent is hereby corrected as shown below:

On the Title Page

Item (73) Delete "Assignee: Imagine Communications Corp., Frisco, TX (US)" and replace with
--Assignee: Imagine Communications Corp., Plano, TX (US)--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*